(No Model.)
S. P. WATT.
CRANK AXLE MECHANISM FOR BICYCLES.
No. 559,828. Patented May 12, 1896.
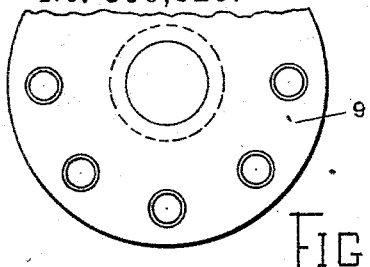
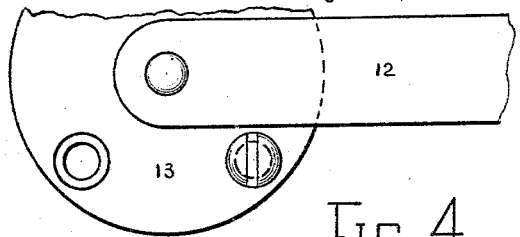
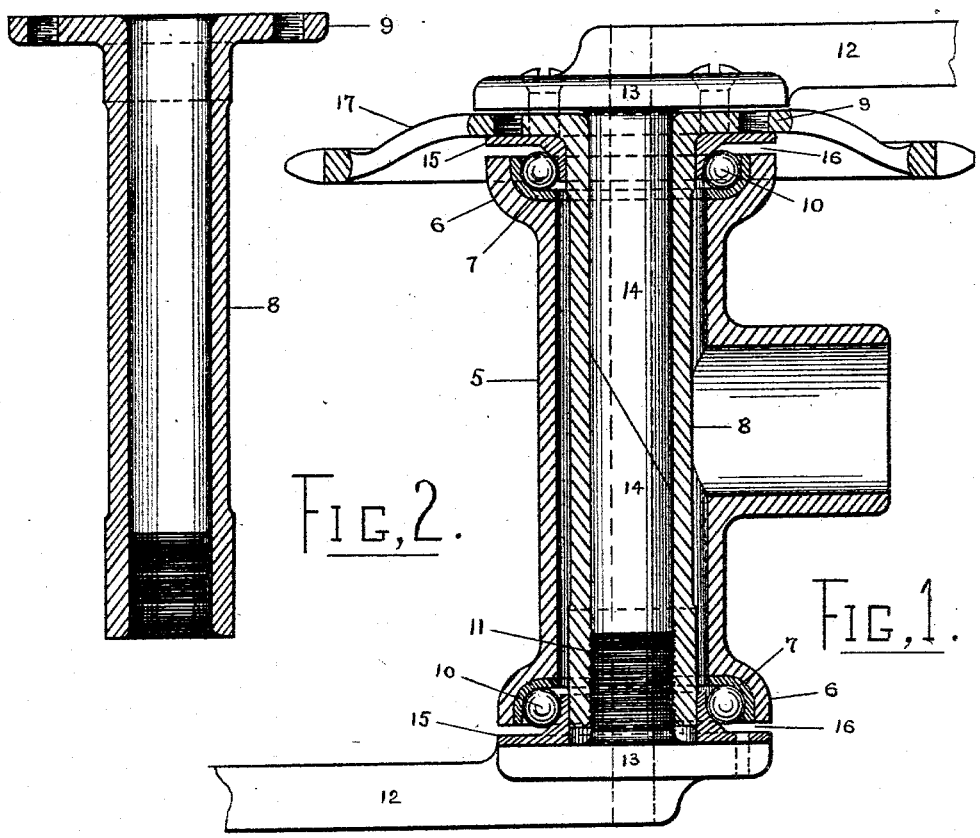
WITNESSES
Chas. A. Stanley.
H. S. Hartman
Sem. P. Watt INVENTOR
By H. C. Hartman,
his Attorney

UNITED STATES PATENT OFFICE.

SERN P. WATT, OF FORT WAYNE, INDIANA, ASSIGNOR OF ONE-HALF TO AUGUST C. KATT, OF SAME PLACE.

CRANK-AXLE MECHANISM FOR BICYCLES.

SPECIFICATION forming part of Letters Patent No. 559,828, dated May 12, 1896.

Application filed May 1, 1895. Serial No. 547,785. (No model.)

*To all whom it may concern:*

Be it known that I, SERN P. WATT, a citizen of the United States, residing at the city of Fort Wayne, in the county of Allen, in the State of Indiana, have invented certain new and useful Improvements in Crank-Axle Mechanism for Bicycles; and I do hereby declare that the following is a full, clear, and exact description of the invention, which will enable others skilled in the art to which it appertains to make and use the same, reference being had to the accompanying drawings, which form part of this specification.

My invention relates to improvements in crank-axle mechanism for bicycles; and its object is to provide an improved device which shall be easily removable and adjustable and form part of the sprocket-wheel; and the invention consists in the construction and novel combination of the parts hereinafter described, pointed out in the appended claims, and illustrated in the accompanying drawings, in which—

Figure 1 is a sectional view of the device. Fig. 2 is a section of the flanged sleeve. Fig. 3 is a plan view of the flanged end of Fig. 2, and Fig. 4 is an end view of the crank and crank-plate.

Similar numerals of reference refer to similar parts throughout the several views.

The construction is as follows: The outside case 5, inclosing the crank-shaft mechanism, is provided at both ends with bearings for the antifriction-balls 10, which bearings are preferably quarter-circular extensions 6, as shown in Fig. 1. In these bearings 6 inner bushing-rings 7 are fitted and placed. A sleeve 8, provided at one end with a flange 9, is placed within the outside case 5 and forms the axle. The sleeve 8 is also provided with an inner screw-thread 11 at the end opposite its flange 9. Outer bushing-rings 15, preferably of the form shown in Fig. 1, are placed over and upon the sleeve 8, one in the angle of the sleeve and flange and the other at the other end of the sleeve, but extending past it slightly, so as to leave a small space between the ends of the sleeve and the outer end of the bushing-ring. By this construction the bushing at the end of the sleeve can be moved inwardly to take up lost motion, when the wear of the bearings require it, without any projection of the sleeve beyond its outer plane, and thereby permit the crank-plate to impinge the bushing-ring at all times. The cranks 12 are provided with crank-plates 13, and also with circular projections 14, adapted to fit snugly in the sleeve 8 and each extending about half the length thereof. The ends of the projections 14 are provided with means for interlocking each other, preferably the construction shown in Fig. 1, which consists in forming the ends in shape of inclined planes closely fitting each other. One of said projections 14 is provided with a screw-thread adapted to be screwed into the thread end of the sleeve 8. The construction throughout is tubular, as shown in the drawings. In the spaces 16 at the bearings I place a felt washer (not shown) to prevent the entrance of dust. I also attach to the flange 9 of the sleeve a sprocket-wheel 17, preferably integrally therewith, as shown in Fig. 1, and thereby save the extra weight of a separately-attached wheel, the flange 9 performing a double function and forming part of a sprocket-wheel.

The operation is as follows: The inner bushings 7 are placed in the extensions 6 of the outside case and the outer bushing-ring 15 placed in the sleeve against its flange, and the sleeve is inserted in the case with the antifriction-balls between the bushing-rings. Then place the other outer bushing-ring on the other end of the sleeve with antifriction-balls between the bushings. Then screw the threaded circular projection of the crank into the sleeve until the bearings are properly adjusted at both ends. Then put the other crank in place, interlocking the projections 14, and secure it to the flanged end of the sleeve 8, preferably by fastening the crank-plate to it with screws, as shown in the drawings.

Having thus described my invention, what I claim as new, and desire to secure by Letters Patent, is—

1. In a crank-axle mechanism for bicycles, a flanged sleeve: cranks provided with circular projections interlocking each other within the sleeve, one crank secured to the flange of the sleeve and the other crank secured by its projection within the other end of the sleeve by screw-threads: an outer case: and bearings at both ends of said case between it and the said sleeve.

2. In a crank-axle mechanism for bicycles, a flanged sleeve and a sprocket-wheel attached thereto, the flange forming part of the wheel: cranks provided with circular projections interlocking each other within the sleeve, one crank secured to the flange of the sleeve, and the other by its projection being screwed into the other end of the sleeve: an inclosing case: antifriction-bearings at both ends of said case between it and the sleeve.

3. In crank-shaft mechanism for bicycles, a sleeve adapted to act as an axle, one end of which is provided with a flange adapted to form part of the mechanism of the bearings at that end of the sleeve: cranks secured to the ends of said sleeve provided with projections entering the sleeve and interlocking therein, one of the cranks provided with a flange adapted to form part of the mechanism of the bearings at the opposite end of the sleeve: an inclosing case, its ends adapted to form part of the mechanism of the bearings: ball-bearings at both ends of the inclosing case between it and the sleeve, held in place against the ends of the inclosing case at one end by the flange of the sleeve, and at the other end by the flange of the crank: and means to adjust the flange of the crank so as to impress it against the bearings and take up any wear thereof.

In testimony whereof I hereunto subscribe my name, in the presence of two witnesses, this 3d day of April, 1895.

SERN P. WATT.

Witnesses:
A. C. KATT,
H. C. HARTMAN.